United States Patent [19]
Grégoire

[11] 3,894,923
[45] July 15, 1975

[54] PROCESS FOR PREPARING BENZOYL CHLORIDE

[75] Inventor: Johannes H. C. M. A. Grégoire, Beek(L), Netherlands

[73] Assignee: Stamicarbon, B.V., Geleen, Netherlands

[22] Filed: Apr. 30, 1974

[21] Appl. No.: 465,626

[30] Foreign Application Priority Data
May 4, 1973 Netherlands................. 7306212

[52] U.S. Cl. .......................... 204/158 HA; 260/544
[51] Int. Cl. .......................... B01j 1/10; C07c 51/58
[58] Field of Search. 204/158 R; 260/544 M, 544 D

[56] References Cited
UNITED STATES PATENTS
3,274,242  9/1966  Etherington et al. ............... 260/544
3,844,917  10/1974  Miller ............................... 204/158

Primary Examiner—Howard S. Williams
Attorney, Agent, or Firm—Cushman, Darby & Cushman

[57] ABSTRACT

Peroxide catalysts and/or ultraviolet light are used to catalyze the liquid phase chlorination of benzaldehyde to produce benzoyl chloride at high efficiency with only trace amounts, if any, of benzal chloride impurities.

6 Claims, No Drawings

PROCESS FOR PREPARING BENZOYL CHLORIDE

BACKGROUND OF THE INVENTION

The invention relates to a process for preparing benzoyl chloride.

U.S. Pat. No. 3,274,242 describes the preparation of benzoyl chloride by reaction of benzaldehyde and chlorine in the gas phase at temperatures of between 225° and 278° C. A disadvantage of this process is that large volumes of inert gas are to be passed through the reaction zone, together with the reactants, in order to achieve a high conversion and a good yield of benzoyl chloride. Another disadvantage is that, at the high temperatures to be applied, chlorination of the benzene nucleus of the benzaldehyde may occur, which adversely affects the purity of the end-product. Further, because of the high temperature, the equipment used in this process appears to be subject to strong corrosion, unless very costly materials are applied.

It is also generally known that benzaldehyde may also be chlorinated in the liquid phase, in which sulfur, anthracene, hydroquinone, phosphorus oxychloride, phosphorus oxybromide or sulfur chloride is used as catalyst optionally in combination with light radiation, especially ultraviolet light; see Italian Pat. Nos. 396,583 and 441,517. Of these catalysts sulfur is especially preferred. Conducting the process the liquid phase is advantageous over using the gas phase because in the liquid phase the conversion is conveniently conducted at a lower temperature and recovery of the reaction product is less cumbersome. It has appeared, however, that while operating in the liquid phase and using a sulfur catalyst, whether or not in combination with ultraviolet light, the efficiency of the conversion amounts to only approximately 85 % and the end-product is rather impure, contaminated mainly by benzal chloride, and this compound can only be removed by a very cumbersome, and hence costly, distillation. Surprisingly, I have now found that conducting the conversion process in the liquid phase and using exclusively ultra-violet light by itself as a catalyst, or in combination with peroxide catalysts, or using peroxide catalysts (described below) by themselve that both a higher efficiency and a greater purity of the end-product can be obtained than is the case with the use of sulfur as the catalyst. Indeed, I have further found that peroxides by themselves are highly suitable as catalysts.

DETAILED DESCRIPTION OF THE INVENTION

Accordingly, the present invention provides a process for preparing benzoyl chloride by chlorination of benzaldehyde in the liquid phase, in which a high efficiency and a very good purity of the end-product can be obtained.

The process according to the present invention is characterized in that the chlorination is carried out in the presence of a peroxide catalyst or under the influence of ultra-violet light or a combination of the two. In the process according to the invention various peroxides may be applied including inorganic peroxides, for instance hydrogen peroxide and sodium peroxide, and organic peroxides, such as aliphatic peroxides, like acetyl peroxide, propionyl peroxide, pelargonyl peroxide, decanoyl peroxide, lauroyl peroxide, butylperoxypivalate, t-butylperoxyoctoate, t-butylperoxyisobutyrate, t-butylperacetate, succinic acid peroxide, t-butylperoxymaleic acid, t-butylhydroperoxide, di-t-butyl peroxide, 2,5-dimethyl-2,5-bis-(t-butyl-peroxy)hexane, n-butyl-4,4-bis(t-butylperoxy)valerate, 2,5-dimethyl-2,5-bis(t-butyl-peroxy)hexyne-3, methylethylketoneperoxide, and aromatic peroxides, such as benzoyl peroxide, p-chlorobenzoylperoxide, 2,4-dichlorobenzoylperoxide, t-butylbenzoate, di-t-butylperephthalate, 2,5-dimethylhexane-2,5-dipherbenzoate, and cycloaliphatic peroxides, like 1-hydroxy-1-hydrlperoxydicyclohexylperoxide and bis(1-hydroxycyclohexyl) peroxide. Other such peroxides will be apparent to the skilled operator in view of the above enumeration. Of those mentioned above benzoyl peroxide is particularly suitable because this compound is highly soluble in the reaction medium.

The amount of catalyst employed may be varied according to process conditions, but it usually amounts to about 0.1 to about 5 % by weight, calculated on the quantity of benzaldehyde.

According to another embodiment of the process according to the present invention ultra-violet light of different wave lengths may be used and preferably ultraviolet light having a wave length of the order of about 300 to about 360 mu is used. The light source required for the ultra-violet light may be placed both inside and outside the reaction vessel as is convenient. The purest reaction product and the highest reaction rate can be obtained by combination of the use of a peroxide catalyst and the use of ultra-violet light.

The temperature of the chlorination process according to the present invention may vary within fairly wide limits, for instance between about 40° and about 175°C. I have found that below 40°C the reaction rate may become too low for practical results while above 175°C carbonization may occur. I prefer to use temperatures between about 75° and about 150°C because a good efficiency is achieved and a sufficiently rapid reaction rate can then be realized.

For convenience the chlorination process of my invention is carried out at the atmospheric pressure although higher and lower pressures may be used.

The process of the present invention results in a reaction mixture rich in benzoyl chloride and the product is recovered using traditional techniques, for instance distillation.

Benzoyl chloride is an article of commerce and is used as starting material for the preparation of benzoyl peroxide, which compound in turn is used as initiator for the polymerization of vinyl monomers such as vinyl chloride, styrene, vinyl acetate, acrylates, and as a vulcanization initiator.

My invention will be further described by the following illustrative examples in which all parts and percentages are expressed in terms of weight, unless otherwise indicated.

EXAMPLE 1

Benzaldehyde (106 g) is transferred to a glass flask (250 ml) provided with a reflux cooler. Next, at 95°C, chlorine gas was passed through the benzaldehyde for 45 minutes at a rate of about 24 l/min. The flask was irradiated by the light of a 70 watt high-pressure mercury lamp which primarily radiated light having a wave length of 300–366 mu range and which was placed approximately 10 cm from the flask. During this period of time chlorine (62 g) was introduced, 47.4 g of which are taken up. Hydrogen chloride (24.4 g) was discharged through the reflux cooler. The reaction product was distilled at a vacuum of 12 mm Hg, in which a distillate (119 g) having a boiling range of 80°–120°C was obtained, with a residue (6.5 g) being left behind.

Gas-chromatographic analysis of the distillate gave the following result: benzoyl chloride 69% by weight, benzaldehyde 31% by weight, benzal chloride 0.2% by weight. The conversion of the benzaldehyde amounted to 64%. Of the converted quantity of benzaldehyde 92% was converted into benzoyl chloride.

EXAMPLE 2

Example 1 was repeated, this time using chlorine which was passed through the flask for 60 minutes at 120°C. The conversion of benzaldehyde amounted to 93%. Of the converted quantity of benzaldehyde 94% was converted into benzoyl chloride. The reaction product contained 0.2% by weight of benzal chloride.

EXAMPLE 3

Benzaldehyde (50 g) and benzoyl peroxide (0.25 g) were transferred to a glass flask (250 ml) provided with a reflux cooler. Subsequently, at 95°C, chlorine gas was passed through the flask at a rate of about 12 liters per hour. At the same time, benzaldehyde (162 g) containing 0.5% by weight of benzoyl peroxide was supplied over a period of about 3½ hours. The quantity of chlorine taken up by the reaction amounted to 146 g. Hydrogen chloride (75.1 g) was discharged through the reflux cooler. The reaction product was then distilled at a pressure of 13 mm Hg and a distillate (266 g.), boiling range 80°–120°C, and residue (11 g) were obtained.

Gas-chromatographic analysis showed that the distillate contained 99% by weight of benzoyl chloride, 0.62% by weight of benzaldehyde and 0.05% by weight of benzal chloride. The conversion of benzaldehyde amounted to 99%. Of the converted quantity of benzaldehyde 95% was converted into benzoyl chloride.

COMPARATIVE EXAMPLE

In the manner of Example 1 benzaldehyde was chlorinated with sulfur (0.1%) as catalyst at 120°C. The flask contained benzaldehyde (106 g) which was previously purified by distillation. Chlorine was introduced at a rate of about 15 liter/hour for 1½ hours. During this period of time chlorine (68 g) was taken up. Hydrogen chloride (34.9) was discharged through the reflux cooler. The reaction product was distilled under a vacuum of 12 mm Hg and the distillate was analyzed gas-chromatographically. The result of this analysis was: benzoyl chloride 98% by weight, benzaldehyde 0.4% by weight, benzal chloride 1.5% by weight. The conversion of benzaldehyde amounted to 99%. Of the converted quantity of benzaldehyde 82% was converted into benzoyl chloride.

What is claimed:

1. In a process for the preparation of benzoyl chloride comprising chlorinating benzaldehyde in the liquid phase, the improvement comprising using as a catalyst for said reaction:
   a. a peroxide catalyst;
   b. an ultra-violet light catalyst; or
   c. the combination of catalysts (a) and (b) at a temperature of the order of about 40° to about 175°C.

2. The process of claim 1 wherein benzoyl peroxide is the peroxide catalyst.

3. The process of claim 1 wherein the chlorination is conducted under the presence of ultra-violet light having a wave length of between about 300 and about 360 mu.

4. The process of claim 2 wherein from about 0.1 to about 5 weight percent of said peroxide catalyst is employed calculated on the amount of the benzaldehyde reactant.

5. A process for preparing benzoyl chloride comprising reacting together at a temperature of about 40° to about 175°C, in the liquid phase, benzaldehyde and chlorine in the presence of a catalyst selected from the group consisting of (a) from about 0.1 to about 5 weight percent of a peroxide catalyst; (b) ultra-violet light having a wave length of the order of about 300 to about 360 mu; and (c) the combination of catalysts (a) and (b).

6. The process of claim 5 wherein the chlorination reaction is conducted at a temperature of about 75° to about 150°C.

* * * * *